(12) United States Patent
Glascock et al.

(10) Patent No.: US 9,578,885 B1
(45) Date of Patent: Feb. 28, 2017

(54) ROTATING SPRAY BAR ASSEMBLY, PROCESSING SYSTEMS HAVING A ROTATING SPRAY BAR ASSEMBLY, AND METHODS OF PROCESSING

(71) Applicant: Zee Company, Inc., Chattanooga, TN (US)

(72) Inventors: Battle Glascock, Soddy Daisy, TN (US); Robert C. Bullard, Signal Mountain, TN (US); James A. Faller, Chattanooga, TN (US); Jonathon R. Bullard, Chattanooga, TN (US)

(73) Assignee: Zee Company, Inc., Chattanooga, TN (US)

(*) Notice: Subject to any disclaimer, the term of this patent is extended or adjusted under 35 U.S.C. 154(b) by 0 days.

(21) Appl. No.: 15/141,261

(22) Filed: Apr. 28, 2016

Related U.S. Application Data

(60) Provisional application No. 62/153,805, filed on Apr. 28, 2015.

(51) Int. Cl.
  *B05B 17/00* (2006.01)
  *A23B 4/30* (2006.01)
  (Continued)

(52) U.S. Cl.
  CPC .................. *A23B 4/30* (2013.01); *A23B 4/12* (2013.01); *A23B 4/16* (2013.01); *A23B 4/24* (2013.01);
  (Continued)

(58) Field of Classification Search
  CPC  B05B 3/12; B05B 1/3026; B05B 1/20; B05B 1/083; B05B 3/0422; B05B 1/1672;
  (Continued)

(56) References Cited

U.S. PATENT DOCUMENTS

| 1,191,483 | A  | * | 7/1916 | Thomas | .................... B05B 3/06 |
|---|---|---|---|---|---|
|   |   |   |   |   | 239/263.2 |
| 7,007,865 | B2 | * | 3/2006 | Dodd | .................... B05B 1/1672 |
|   |   |   |   |   | 239/225.1 |

(Continued)

*Primary Examiner* — Steven J Ganey
(74) *Attorney, Agent, or Firm* — Patterson Thuente Pedersen, P.A.

(57) ABSTRACT

Rotating spray systems and related methods for enhancing spray performance can include one of more rotating spray assemblies formed of a plurality of individual, linear distribution manifolds to define a rotary cage. The rotary cage is fluidly coupled to a rotating distribution block on a distribution valve, with each linear distribution manifold being fluidly coupled to one of a plurality of distribution conduits defined in the rotating distribution block. The distribution valve further includes a fixed distribution block having an arcuate aperture defined therein. The rotating distribution block rotates relative to the fixed distribution block to individually and sequentially engage each distribution conduit with the arcuate aperture. When the individual distribution conduits are fluidly engaged with the arcuate aperture, pressurized fluid supplied to the distribution valve is supplied to the corresponding linear distribution manifold for spraying by one or more spray nozzles fluidly connected to each linear distribution manifold.

17 Claims, 19 Drawing Sheets

(51) Int. Cl.
*A23B 4/12* (2006.01)
*A23B 4/24* (2006.01)
*A23B 4/16* (2006.01)
*B05B 3/12* (2006.01)
*B05B 1/16* (2006.01)
*B05B 1/20* (2006.01)
*B05B 1/30* (2006.01)
*B05B 3/04* (2006.01)

(52) U.S. Cl.
CPC .............. *B05B 1/1672* (2013.01); *B05B 1/20* (2013.01); *B05B 1/3026* (2013.01); *B05B 3/0422* (2013.01); *B05B 3/12* (2013.01)

(58) Field of Classification Search
CPC   B05B 3/044; B05B 12/06; B05B 3/02; B05B 1/14; B05B 15/069; A23B 4/30; A23B 4/12; A23B 4/16; A23B 4/24
USPC ...... 239/99, 101, 225.1, 237, 242, 246, 248, 239/263.1, 263.2, 550, 562, 563, 566, 239/569, 581.1
See application file for complete search history.

(56) References Cited

U.S. PATENT DOCUMENTS 7,624,934 B2 * 12/2009 Breedlove ............. B05B 3/0454
239/242
7,942,347 B2 * 5/2011 Huang ................... B05B 3/044
239/581.1

\* cited by examiner

Simulation 2

Simulation 1

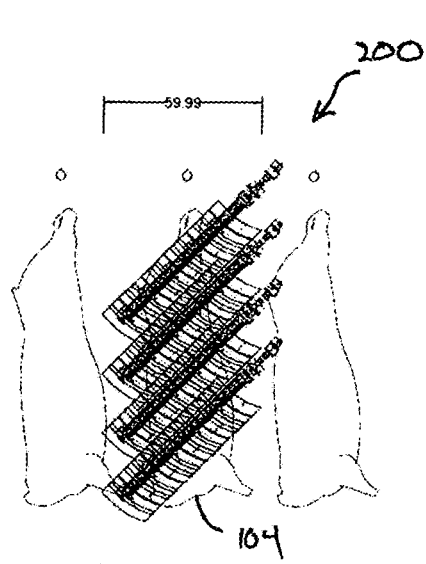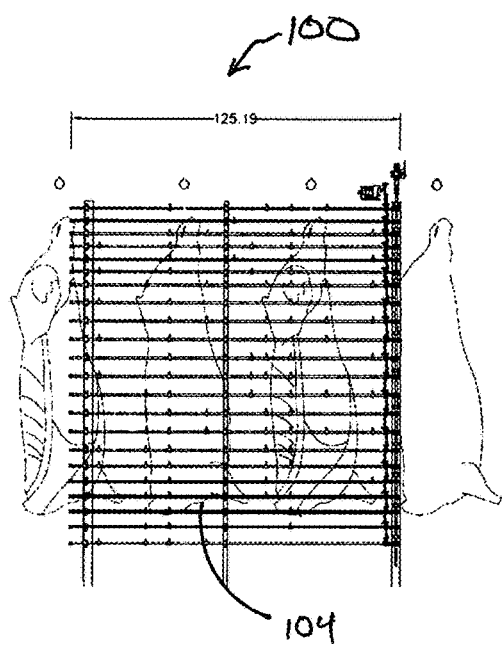
FIG. 20
SIMULATION 2
FIG. 13
SIMULATION 1

Simulation 1

Simulation 2

Simulation 1

Simulation 1

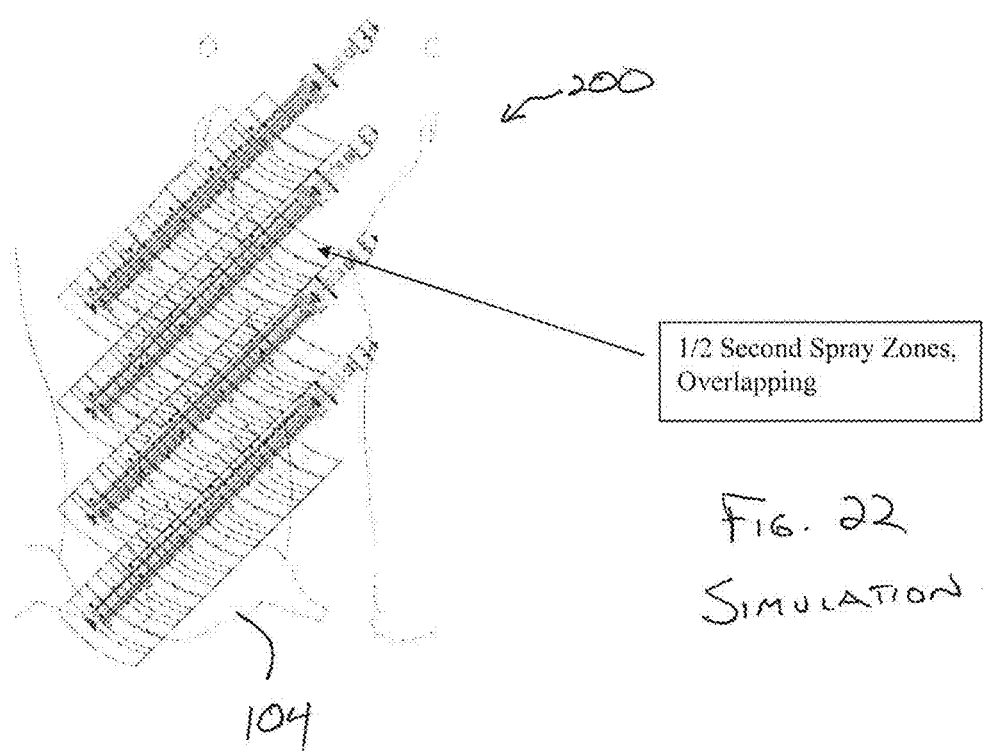

SIMULATION 2

ROTATING SPRAY BAR ASSEMBLY, PROCESSING SYSTEMS HAVING A ROTATING SPRAY BAR ASSEMBLY, AND METHODS OF PROCESSING

CROSS-REFERENCE TO RELATED APPLICATION

The present application claims the benefit of U.S. Provisional Application No. 62/153,805, filed Apr. 28, 2015, which is hereby incorporated herein in its entirety by reference.

TECHNICAL FIELD

The present invention generally relates to spray systems for introducing liquids and/or gases during industrial manufacturing and processing. More specifically, the present invention is directed to a rotating spray bar assembly having a plurality of rotating nozzle manifolds that increase spray nozzle effectiveness while allowing for nozzle discharge to be controlled within a desired application pattern and dispensing range, particularly for processing of food products.

BACKGROUND

Spray technologies are a well known and commonly utilized feature in a variety of industrial processes. Depending upon the particular process, suitable liquids and/or gases can be applied for a variety of reasons including, for example, cleaning, etching, cooling, heating, coating, descaling, blasting, sanitizing, or surface preparation of hard or soft surfaces as part of an overall process or as a stand-alone operation. Regardless of the specific application, spray technology applications generally involve selection of the appropriate liquids and/or gases to be sprayed, a spray nozzle designed for the intended spray process, and a means of positioning or actuating the nozzle relative to an item or surface to be sprayed. For many industries utilizing spray applications, the science involving selection of the appropriate liquid and/or gas for a given process is well established, while in other industries, new chemistries and processes are being continually developed. In addition to selecting the appropriate liquids and/or gases for spray application, other process variables generally involve the configuration of the spray action as well as its shape, intensity, pulsation frequency, coverage area and angle of impingement on an item or surface to be affected.

As it relates to the processing of food products, spray technologies have been utilized in the washing, cleaning and/or sanitization thereof. In the particular instance of processing meat products, such as red meat, pork and/or poultry, finishing cabinets having an oscillating spray bar assembly have been utilized to spray the respective carcass that often is suspended from overhead conveyors so as carry the carcasses through the cabinets during the meat processing. Located within the spray cabinet are a series of horizontally positioned spray headers with spray nozzles located down the length. The spray nozzles are positioned to direct the spray towards the surface of the meat as it traverses the length of the cabinet. The spray bars are mechanically linked to an oscillating drive that rotates each spray assembly in an up and down motion. The oscillating spray assembly is directed in an up/down repeating pattern, wherein a fluid source is generally sprayed from the spray nozzles and against the carcasses, either during both of the "up stroke" and "down stroke" or only when the spray assembly is on the down stroke. The oscillating spray bar assembly can operate within an angular path range of less than 90 degrees, and more conventionally, approximately 75 degrees. In this conventional installation, each oscillating spray bar assembly is oscillated through the down stroke range and back in approximately 1 second. These oscillating spray bar assemblies, however, are not very efficient.

Generally, there are two primary goals in a typical spray cabinet operation in meat processing facilities. The first is the removal of debris, bone fragments, loose fats and materials generated during evisceration and found on the outer surface of the meat. The second function and the most important part of the process is the reduction of the bacteria load resulting from the spread of bacteria laden materials during the evisceration process.

Bacteria are spread from one surface to another during the evisceration process by contact with other bacteria laden surfaces. Their numbers natural multiply unless the process is designed to combat the spread and growth of bacteria with antimicrobial chemistries or sufficiently high water temperatures. Antimicrobial chemistries are infused into the water supply prior to being delivered to the spray assembly. The water spray is used to mechanically remove surface materials and the infused chemistry or water temperature affects the bacteria load.

Surface materials are removed by the impact force of the water on the surface of the meat and therefore a single direction flow in a downward direction is beneficial as compared to the spray of water in both the up and down direction. Debris and bacteria are caused to flow in the direction of the water flow stream and therefore when spraying the surface on the up stroke of the spray assembly, these materials are allowed to dislodge from a lower surface and be deposited at a position which is located above their previous position. This leads to an increase in water consumption along with the chemicals or heated water. Furthermore, with the conventional oscillating spray bar assemblies spraying only during the down stroke, the spray does not continuously impact the surface of the meat nor does it continually maintain the downward directional flow as the spray stops at the bottom of the "down stroke" until the assembly traverses the angular path range and reaches a top starting position before spraying the carcass again.

While a variety of spray technologies and processes exist, it would be desirable to further advance the technology. Specifically, it would be advantageous to have spray technologies that combine enhanced spray coverage with decreased waste, and the associate costs, of the liquids and/or gases to be sprayed. It would also be advantageous to have spray technologies that provide continuous, uninterrupted spraying onto the desired material with the highest total surface spray impact dwell time.

SUMMARY

Spray systems, and rotating spray bar assemblies, of the presently disclosed invention and their related methods of use meet the goals of enhanced spray coverage while at the same time, reducing waste by enhancing the efficiency of the spray process. As will be described and illustrated, spray systems of the present invention utilize one or more rotating spray bar assemblies comprising a plurality of linear distribution manifolds arranged to define a rotary cage for enhancing spray coverage and controlling spray discharge including spray flow and spray discharge vectors to optimize spray performance on an item or surface to be sprayed. The rotating spray assemblies of the present invention can further comprise a distribution valve comprising a fixed distribution block and a rotating distribution block. The fixed distribution block can comprise an arcuate aperture while the rotating distribution block comprises a plurality of distribution conduits, with each distribution conduit being independently fluidly connected to a corresponding linear distribution manifold. As the rotating distribution block rotates relative to the fixed distribution block, each distribution manifold is sequentially, fluidly engaged with the arcuate aperture to supply a spray fluid through the distribution valve and into the corresponding linear distribution manifold, whereby a plurality of spray nozzles spray the spray fluid on items to be sprayed. By selecting a configuration of the arcuate aperture, the spray pattern of the rotating spray bar assembly can be tailored to specific applications.

In one aspect, a representative spray system of the present invention can comprise one or more rotating spray assemblies formed of a plurality of individual, linear distribution manifolds. The plurality of individual, linear distribution manifolds can be arranged to form a rotary cage that rotates about a linear axis that is parallel to an axis defined by each linear distribution manifold. Each linear distribution manifold can include a manifold inlet and a manifold flow channel, wherein a plurality of manifold apertures are defined along, and in fluid communication with the manifold flow channel. A spray nozzle can be operably mounted within each manifold aperture. A distribution valve comprising a fixed distribution block and a rotary distribution block can be fluidly coupled to the rotary cage. The fixed distribution block comprises an arcuate aperture and the rotary distribution block comprises a plurality of distribution conduits, wherein each distribution conduit is individually, fluidly connected to the manifold inlet of a corresponding linear distribution manifold. The rotary distribution block can rotate relative to the fixed distribution block such that the distribution conduits rotatably and sequentially engage the arcuate aperture. A pressurized fluid can be supplied to the fixed distribution block such that as each distribution block sequentially engages the arcuate aperture, pressurized fluid is introduced into each linear distribution manifold so as to be sprayed from the corresponding spray nozzles. The rotating spray assembly can further comprise a means for rotating the rotating spray assembly, for example, a motor or belt driven apparatus, so as to induce rotation of the rotary cage and the rotary distribution block.

In another aspect, a method for spraying items can comprise the step of supplying a pressurized fluid to a fixed distribution block of a distribution valve. The method can further comprise the step of rotating a rotating distribution block of the distribution valve relative to the fixed distribution block such that a plurality of distribution conduits defined within the rotating distribution block are rotatably, sequentially introduced to, and fluidly engage, an arcuate aperture on the fixed distribution block. The method can further comprise directing the pressurized fluid through each distribution conduit during the time it is fluidly engaged with the arcuate aperture, wherein each distribution conduit is individually, fluidly connected to a linear distribution manifold. The method can further comprise spraying the pressurized fluid from the linear distribution manifold through a plurality of spray nozzles on the linear distribution manifold during the time that the corresponding distribution conduit is fluidly engaged with the arcuate aperture. The method can further comprise defining a rotary cage with the linear distribution manifolds that each engage their corresponding distribution conduit, wherein the rotary cage rotates in unison with the rotating distribution block. The method can further comprise rotating the rotary cage around an axis that is parallel to the orientation of each linear distribution manifold. The method can further comprise adjusting a spray pattern for each linear distribution manifold by changing a length of the arcuate aperture. The method can further comprise rotating the rotary cage and the rotating distribution block with a means for rotating including, for example, a motor or belt driven system.

In another aspect, the present invention is directed to rotary spray systems and related methods for increasing contact time with items to be sprayed.

In yet another aspect, the present invention is directed to rotary spray systems and related methods for reducing a spray system footprint.

In yet another aspect, the present invention is directed to rotary spray systems and related methods for increasing spray system performance with reduced amounts of spray fluid.

In yet another aspect, the spray bar assembly sprays a gas or liquid at a pressure of at least 25 psi, in some aspects greater than at least 50 psi, in some aspects greater than at least 75 psi, in some aspects greater than at least 100 psi, in some aspects greater than at least 125 psi, in some aspects greater than at least 150 psi, in some aspects greater than at least 175 psi, in some aspects greater than at least 200 psi, in some aspects greater than at least 225 psi, in some aspects greater than at least 250 psi. In some other aspects, the spray bar assembly sprays a gas or liquid at a pressure between about 20 psi and about 250 psi, in some other aspects between about 25 psi and about 225 psi, in some other aspects between about 30 psi and about 215 psi, in some other aspects between about 30 psi and about 200 psi, in some other aspects between about 35 psi and about 175 psi, in some other aspects between about 40 psi and about 150 psi, in some other aspects between about 50 psi and about 125 psi, in some other aspects between about 20 psi and about 100 psi, in some other aspects between about 25 psi and about 75 psi, with other subranges within these foregoing ranges contemplated herein.

In some other aspects of the present invention, the spray bar assembly rotates at about 10 revolutions per minute (RPM) to about 100 RPM, in some other aspects about 15 RPM to about 90 RPM, in some other aspects about 20 RPM to about 80 RPM, in some other aspects about 25 RPM to about 75 RPM, with other subranges within these foregoing ranges contemplated herein.

In yet another aspect, the present invention is directed to spraying a chemical intervention solution onto a food product using one or more spray bar assemblies. In some aspects, the food product is an animal carcass or meat cut, including muscle meats that include beef, pork, veal, buffalo, lamb, sea foods that include scallops, shrimp, crab, octopus, mussels, squid or lobster, poultry that includes chicken, turkey, ostrich, game hen, squab or pheasant. In some other aspects, the food product includes eggs, nuts, vegetable, fruits and the like.

In some aspects of the present invention, the chemical intervention solution comprises at least one peroxycarboxylic acid having between about 2 to 12 carbon atoms, and in some aspects comprises peroxyacetic acid. In some aspects, the peroxycarboxylic acid is an equilibrium peroxycarboxylic acid solution, while in some other aspects the peroxycarboxylic acid is a pH modified peroxycarboxylic acid solution. In some aspects, the intervention solution is between about 10 ppm and about 5000 ppm, in some aspects between about 100 ppm and about 2500 ppm, in some aspects between about 250 ppm and about 1500 ppm, in some aspects between about 300 ppm and about 1000 ppm, in some other aspects between about 350 ppm and about 750 ppm, in some aspects between about 10 ppm and 300 ppm, in some aspects between about 25 ppm and about 100 ppm, in some other aspects between about 50 ppm and about 500 ppm.

In some aspects, the equilibrium peroxycarboxylic acid has a pH above about 3.0 and below about 7.0, in certain aspects a pH range of about 3.5 to about 5.5, and in some other aspects a pH range of about 3.5 to about 5.0. In certain preferred aspects of the present invention, the equilibrium peroxycarboxylic acid comprises peroxyacetic acid.

In some aspects, the intervention solution comprises a pH modified peroxycarboxylic acid. In some aspects, the pH modified peroxycarboxylic acid has a pH above about 7.0 and below about 10.0, in certain aspects a pH range of about 7.0 to about 9.5, and in some other aspects a pH range of about 7.5 to about 9.0. In certain preferred aspects of the present invention, the pH modified peroxycarboxylic acid comprises peroxyacetic acid.

In certain aspects of the present invention, the pH modified peroxycarboxylic acid is prepared using at least one buffering agent, said at least one buffering agent chosen from sodium hydroxide, potassium hydroxide, sodium salts of carbonic acid, potassium salts of carbonic acid, phosphoric acid, silicic acid and combinations thereof.

In some aspects, the intervention solution is provided at an elevated temperature between about 100° F. and about 150° F., in certain aspects between about 110° F. and about 140° F., in certain aspects between about 115° F. and about 135° F., in certain aspects between about 120° F. and about 130° F., and in certain aspects between about 122° F. and about 128° F.

In some aspects, the peroxycarboxylic acid solution is chosen from peroxyformic, peroxypropionic, peroxyacetic, peroxybutanoic, peroxypentanoic, peroxyhexanoic, peroxyheptanoic, peroxyoctanoic, peroxynonanoic, peroxydecanoic, peroxyundecanoic, peroxydodecanoic, peroxylactic, peroxymaleic, peroxyascorbic, peroxyhydroxyacetic, peroxyoxalic, peroxymalonic, peroxysuccinic, peroxyglutaric, peroxyadipic, peroxypimelic, peroxysubric acid, peroxycitric acid, and mixtures thereof.

In some aspects, the processing liquid comprises a chemical intervention solution chosen from chlorine, bromine, cetylpyridinium chloride (CPC), an organic acid, a peroxycarboxylic acid, trisodium phospate, acidified sodium chlorite, and chlorine dioxide.

In some other aspects of the present invention, the rotating spray bar assembly can be used to spray other liquids or gases onto a desired surface. In some aspects, the rotating spray bar assembly may be used to spray a primer, paint, varnish, and/or sealer onto a substrate. In some other aspects, the rotating spray bar assembly may be used to spray a coating onto a substrate. In some other aspects, the rotating spray bar assembly may be used to spray a solution or solvent onto a substrate. In some other aspects, the rotating spray bar assembly may be used to spray a liquid food product onto a receiving food product, such as coating the receiving food product with a chocolate layer.

The above summary of the various representative embodiments of the invention is not intended to describe each illustrated embodiment or every implementation of the invention. Rather, the embodiments are chosen and described so that others skilled in the art can appreciate and understand the principles and practices of the invention. The figures in the detailed description that follow more particularly exemplify these embodiments.

BRIEF DESCRIPTION OF THE DRAWINGS

The present invention can be more completely understood in consideration of the following detailed description of various embodiments of the invention in connection with the accompanying drawings, in which:

FIG. 1b is a partially hidden end view of the spray system of FIG. 1a.

FIG. 1c is a partially hidden side view of the spray system of FIG. 1a.

FIG. 2b is a partially hidden side view of the spray system of FIG. 2a.

FIG. 13 is a side view of an oscillating spray system as utilized in Simulation 1.

FIG. 20 is a perspective, side view of a rotating spray system as utilized in Simulation 2 according to an embodiment of the present invention.

FIG. 22 is a side view of the rotating spray system as utilized in Simulation 2 illustrating 0.5 second overlapping spray zones on items being sprayed according to an embodiment of the present invention.

Figure 1A:
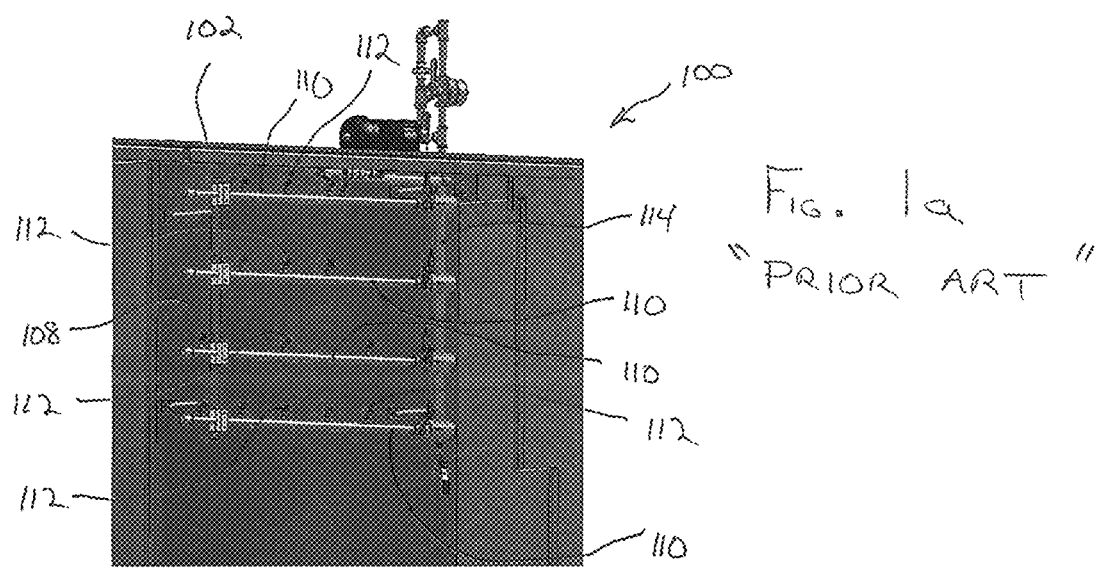
FIG. 1a is a perspective end view of a spray system utilizing oscillating spray assemblies of the prior art.

While the present invention is amenable to various modifications and alternative forms, specifics thereof have been shown by way of example in the drawings and will be described in detail. It should be understood, however, that the intention is not to limit the present invention to the particular embodiments described. On the contrary, the intention is to cover all modifications, equivalents, and alternatives falling within the spirit and scope of the present invention as defined by the appended claims.

DETAILED DESCRIPTION OF THE DRAWINGS

Figures 1B, 1C:
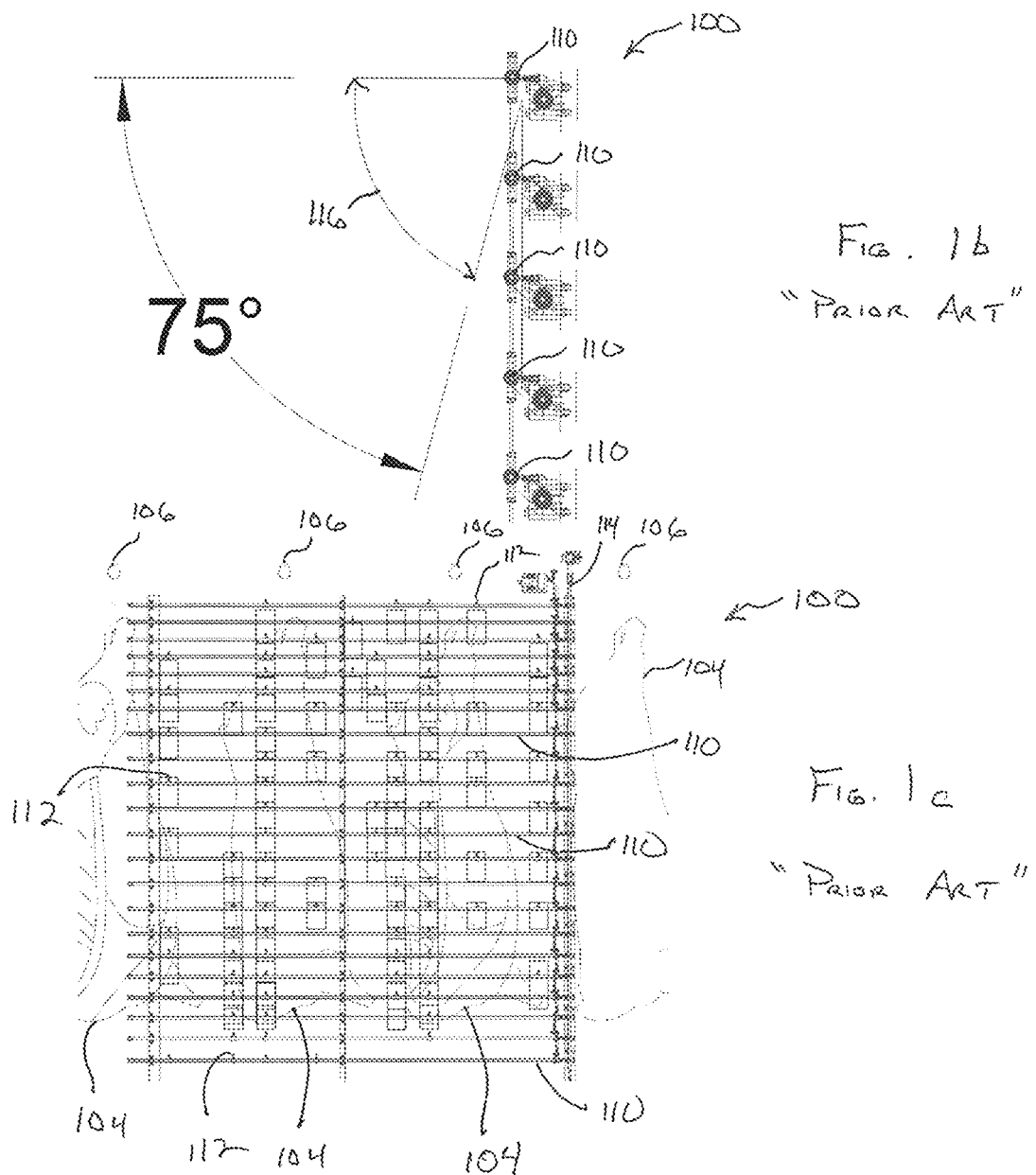

With reference to FIGS. 1a, 1b and 1c, a spray system 100 of the prior art can comprise one or more cabinets/tunnels 102 through which items to be spray are conveyed. In the case of a typical meat processing plant, these items often comprise beef, pork or poultry carcasses 104 that are suspended from overhead conveyors 106 so as carry the carcasses 104 through the cabinets 102. Each cabinet generally comprises a plurality of side walls 108 to which individual spray assemblies 110 are mounted. Each spray assembly 110 generally comprises a plurality of spray nozzles 112 and a spray supply 114. Spray assembly 110 often comprises an oscillating spray assembly, wherein the spray assembly 110 is directed in an up/down repeating pattern and wherein a fluid source is generally sprayed from the spray nozzles 112 and against the carcasses 104 only when the spray assembly 110 is on the "down stroke". As seen in FIG. 1b, the "down stroke" can operate within a down stroke range 116 of less than ninety (90) degrees, and more conventionally, approximately seventy-five (75) degrees. In a conventional installation, each spray assembly 110 can be oscillated through the down stroke range 116 and back in approximately one (1) second.

Figure 2A:
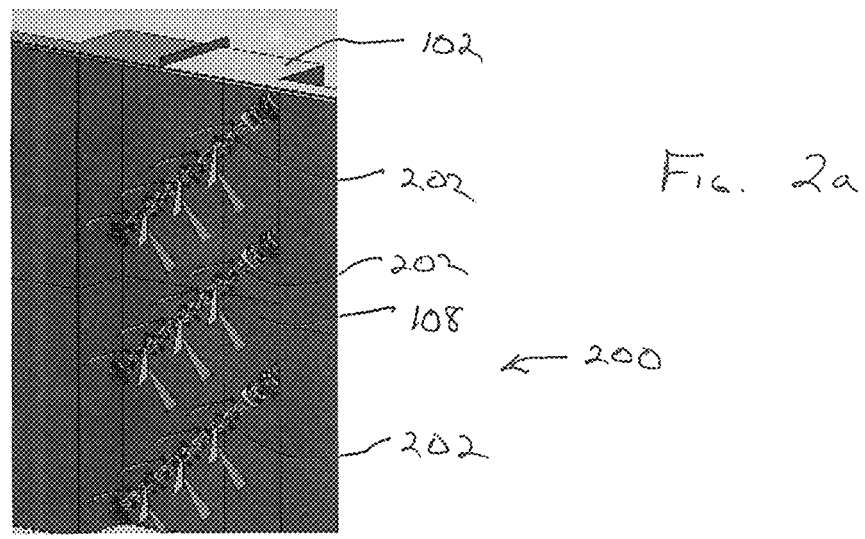
FIG. 2a is a perspective end view of a spray system utilizing rotating spray assemblies according to an embodiment of the present invention.
Figure 2B:
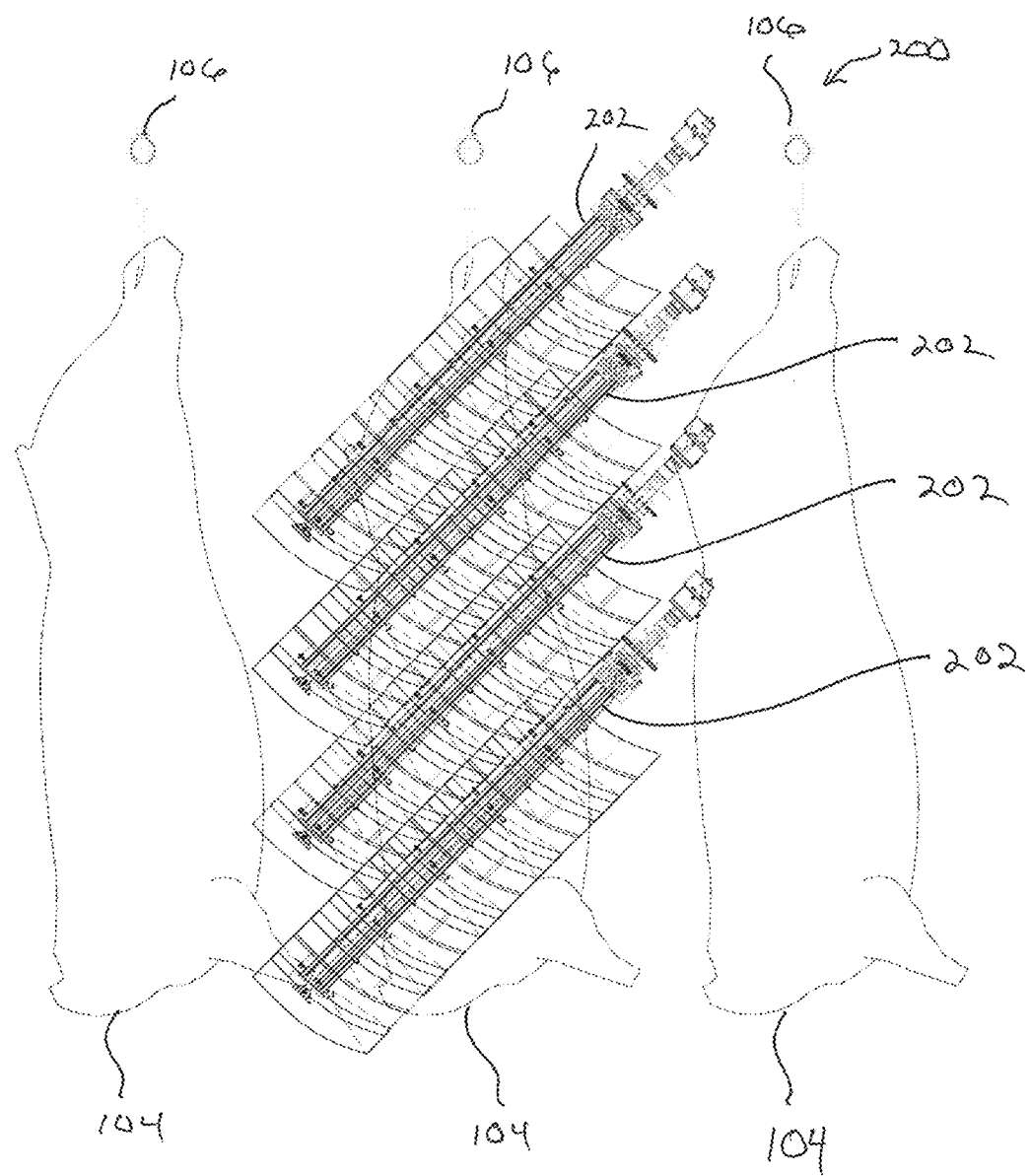

As shown in FIGS. 2a and 2b, an improved spray system 200 of the present invention similarly makes use of cabinets/tunnels 102 and overhead conveyors 106 to carry carcasses 104 through the cabinets/tunnels 102. Spray system 200 improves upon the prior art through the inclusion of one or more rotating spray assemblies 202 on one or more of the side walls 108. As will be described and illustrated in further detail, the rotating spray assemblies do not involve simple oscillating rotation of a spray nozzle as found in the prior art, but instead, involves rotation of the entire rotating spray assembly 202 to improve spray coverage, performance and liquid savings, resulting in increased cleaning efficiency.

Figure 3:
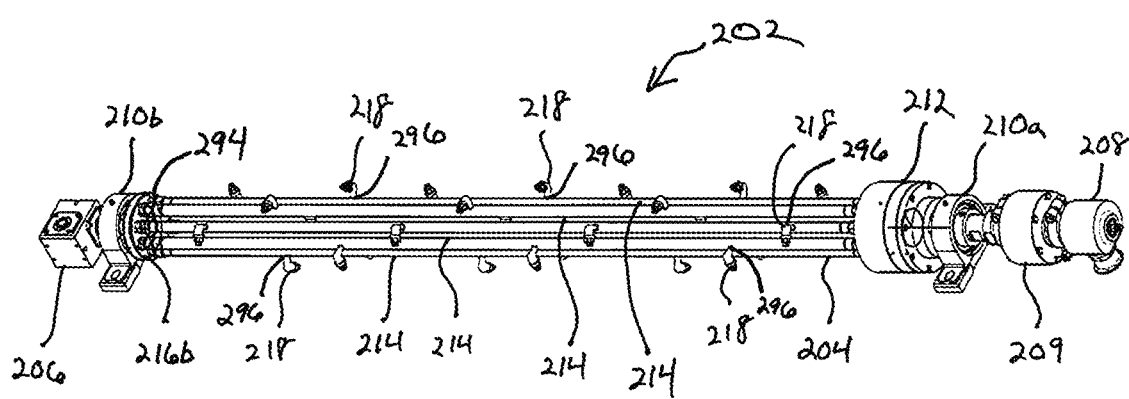
FIG. 3 is a perspective side view of a rotary spray assembly according to an embodiment of the present invention.
Figure 4:
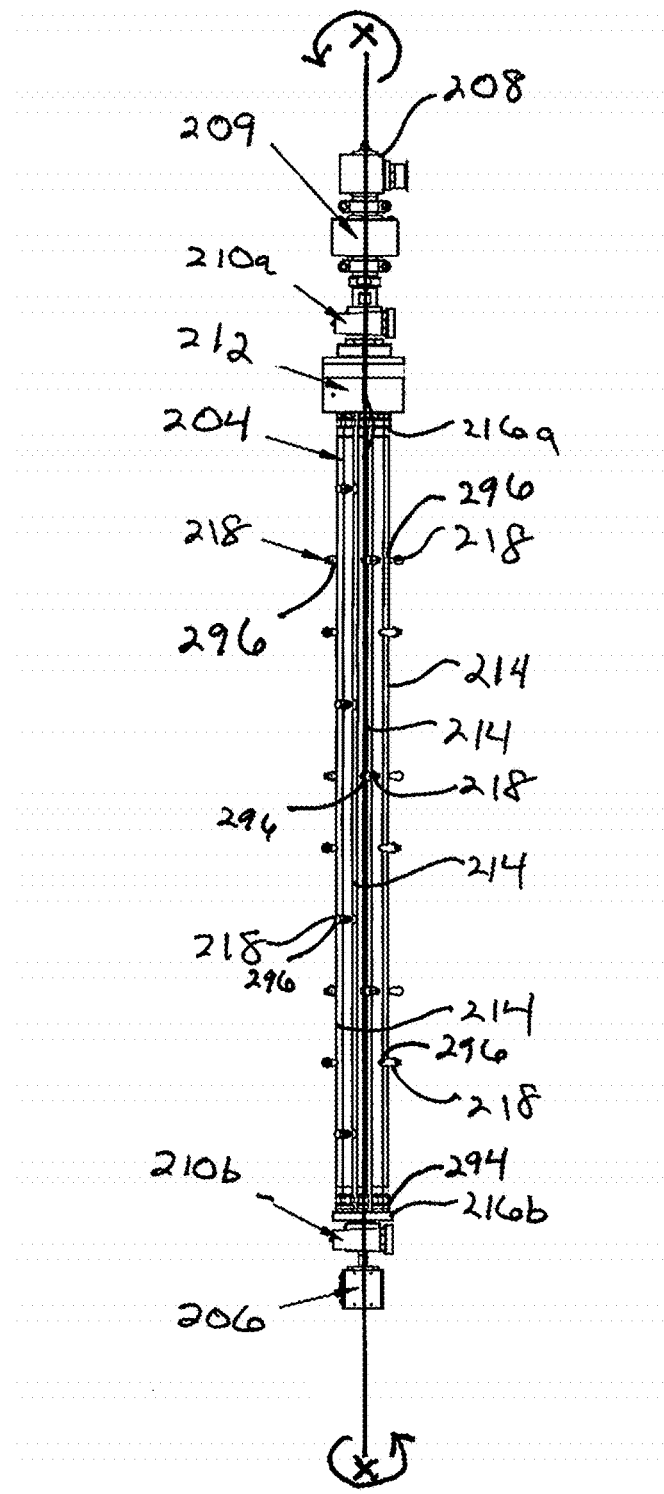
FIG. 4 is a top view of the rotary spray assembly of FIG. 3.

As illustrated in FIGS. 3 and 4, each spray assembly 202 generally comprises a rotary cage 204 mounted between a drive assembly 206 and a fixed connection member 208. The spray assembly 202 further comprises a rotary union 209, a pair of bearing assemblies 210a, 210b and a distribution valve 212. The rotary cage 204 generally comprises a plurality of linear distribution manifolds 214 that are mounted between cage end plates 216a, 216b. Each linear distribution manifold 214 includes at least one spray nozzle 218, and more preferably, a plurality of individual spray nozzles 218 along the axis of the distribution manifold 214. The individual components of the spray assembly 202 are generally formed of corrosion resistant materials such as, for example, metals such as stainless steel and aluminum, ceramics and appropriate polymeric materials. At the various mating surfaces between components and especially, at fluid connection locations, appropriate sealing materials including o-ring seals and the like, formed of chemically appropriate materials, are utilized.

Figure 5:
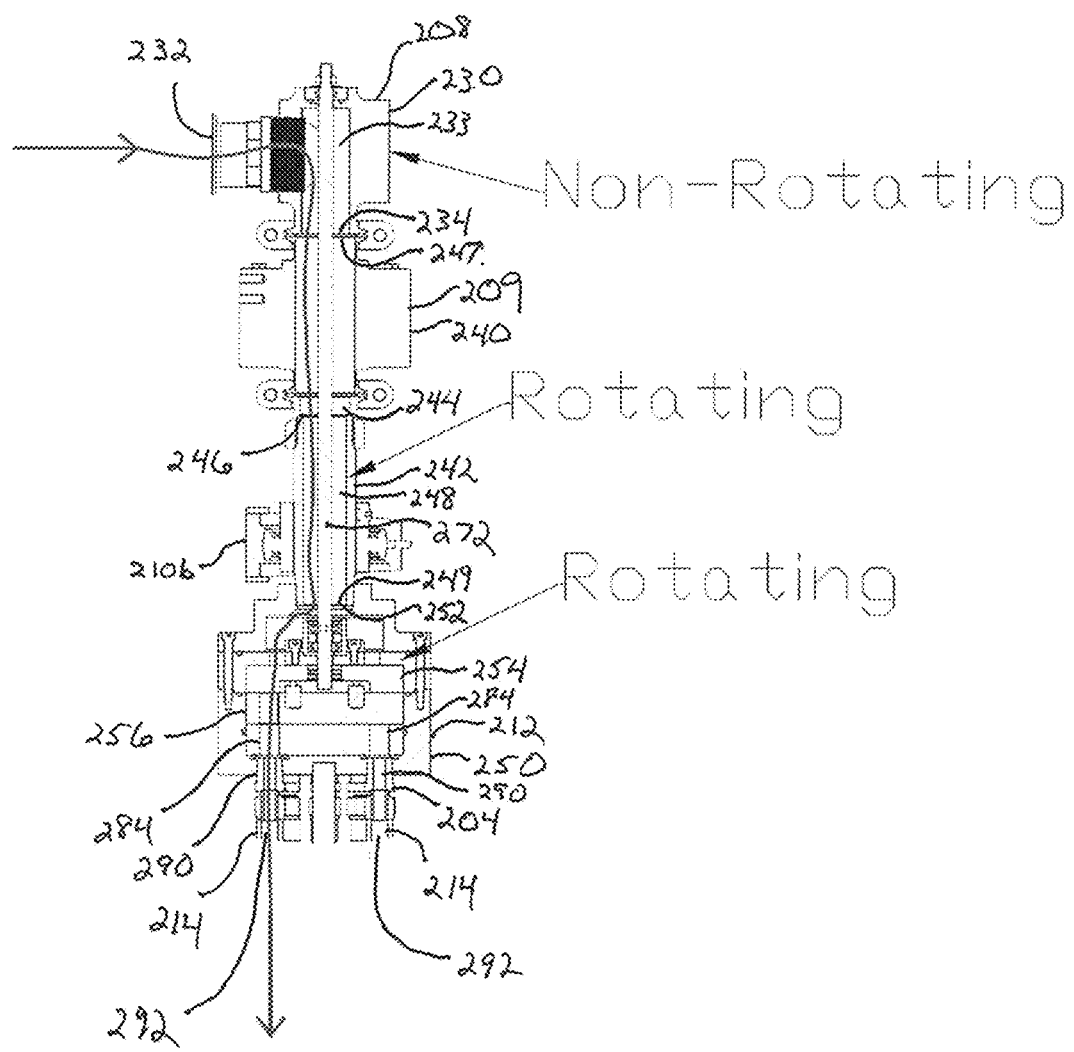
FIG. 5 is a partial, section view of an inlet end of the rotary spray assembly of FIG. 3.

With reference to FIG. 5, fixed connection member 208 generally comprises a connection housing 230 that can be mounted to the side wall 108 of cabinet/tunnel 102 or to another appropriate surface. Connection housing 230 generally defines a fixed fluid inlet 232 to allow the spray assembly 202 to be fluidly connected to a fluid source, for example, a pressurized liquid and/or gas source. The fixed fluid inlet 232 is fluidly connected to a connection flow channel 233 that terminates in a fixed fluid outlet 234. Due to its fixed connection to the cabinet/tunnel 102, fixed connection member 208 remains stationary as various other portions of the spray assembly 202 rotate. The fixed nature of the fixed connection member 208 simplifies both installation of the spray assembly 202 as well as facilitating a leak-free connection between the fluid source and the spray assembly 202.

Referring again to FIG. 5, rotary union 209 includes a union housing 240, a union shaft 242, a union bearing 244 and a union seal 246. Union housing 240 defines a fixed union fluid inlet 247 such that when union housing 240 is coupled to connection housing 230, pressurized fluid can flow from the fixed fluid outlet 234 to the fixed union fluid inlet 247. Union bearing 244 is positioned within the union housing 240. Union shaft 242 is then mounted within the union bearing 244 to allow for rotation of the union shaft 242 within the union housing 240. Union shaft 242 includes a shaft flow channel 248 that terminates in a rotating union fluid outlet 249. Union seal 246 fluidly seals the fixed union fluid inlet 247 and the rotating union shaft 242 to prevent leakage of the pressurized fluid at the connection of the fixed and rotating fluid channels. Union shaft 242 extends outs of the union housing 240 and is supported by the bearing assembly 210b.

As illustrated in FIG. 5, distribution valve 212 includes a valve housing 250 defining a valve inlet 252 that is fluidly connected to the rotating union fluid outlet 249. Mounted within the valve housing 250 is a fixed distribution block 254 and a rotating distribution block 256.

Figures 6, 7:
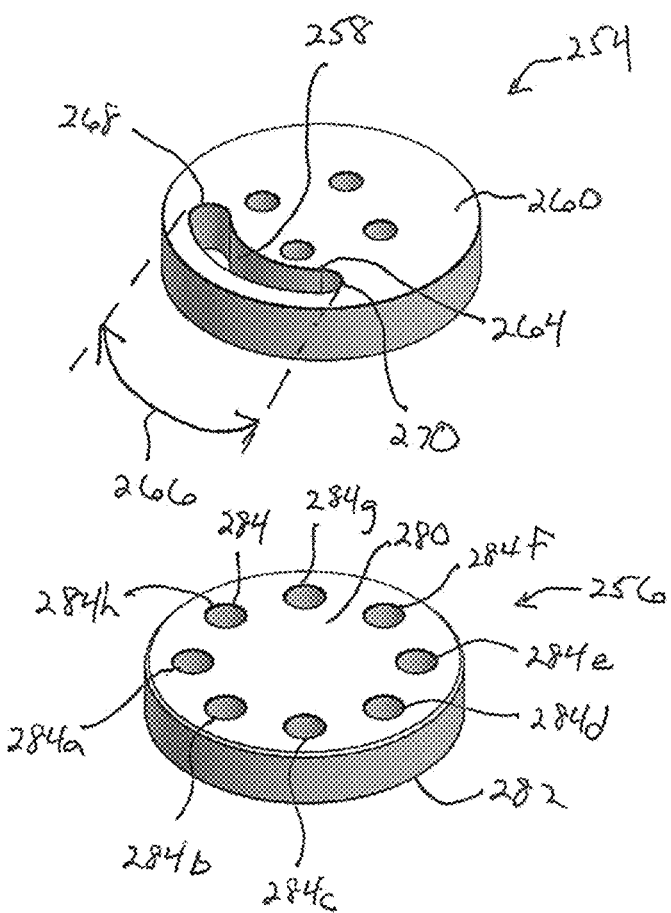
FIG. 6 is a perspective view of a fixed distribution block according to an embodiment of the present invention.
FIG. 7 is a perspective view of a rotating distribution block according to an embodiment of the present invention.

Fixed distribution block 254 and rotating distribution block 256 are each formed of a ceramic material. As illustrated in FIG. 6, fixed distribution block 245 defines an arcuate aperture 258 and includes a distribution face 260. Arcuate aperture 258 generally has an arcuate shape 264 defined along an angular outlet range 266 between a first end 268 and a second end 270. As will be discussed in further detail, outlet range 266 and correspondingly, an arcuate length of the arcuate aperture 258 can be selected to vary spray performance of the spray assembly 202 based on characteristics of the overall spray process. Fixed distribution block 254 is coupled to and fixed into position with an adjustment screw 272 that interconnects the fixed distribution block 254 with the fixed connection member 208 as shown in FIG. 5.

As shown in FIG. 7, rotating distribution block 256 defines a rotation face 280, a manifold face 282 and a plurality of distribution conduits 284 defined between the rotation face 280 and the manifold face 282. Any number of distribution conduits 284 can be included and generally the quantity is selected based upon items to be sprayed and the desired spray performance/arrangement of the rotary cage 204. As illustrated throughout the various figures, rotating distribution block 256 includes eight (8) distribution conduits 284a, 284b, 284c, 284d, 284e, 284f, 284g and 284h, though it will be understood that the number of distribution conduits 284 can be increased or decreased without departing from the spirit and scope of the present invention.

As seen in FIG. 5, rotary cage 204 can mount directly to the manifold face 282 of the rotary distribution block 256, with each linear distribution manifold 214 being fluidly connected to a corresponding distribution conduit 284. Generally, the number of linear distribution manifolds 214 will correspond to the number of distribution conduits 284, for example, eight (8) linear distribution manifolds 214 corresponding to the eight (8) distribution conduits 284 of the rotary distribution block 256 as illustrated throughout the various figures. Each linear distribution manifold 214 individually defines its own manifold inlet 290, an interior manifold flow channel 292, a closed manifold end 294 and a plurality of manifold apertures 296 that are spaced along the length of each linear distribution manifold 214 as shown in FIGS. 3, 4 and 5. Each manifold aperture 296 is configured for receiving and fluidly coupling to one of the spray nozzles 218, such that each spray nozzle 218 is in fluid communication with the interior manifold flow channel 292. Connection of the manifold aperture 296 to its associated spray nozzle 218 can be accomplished with conventional attachment designs including, for example, threaded connections or quick-connect style connections.

As shown in FIGS. 3 and 4, rotary cage 204 is connected to the drive assembly 206. Drive assembly 206 generally comprises a means for rotating or rotating means that provides the rotational motion to the spray assembly 206, i.e. causes the union shaft 242, the rotating distribution block 256 and the rotary cage 204 to rotate around an axis "x" as shown in FIG. 4. Depending upon the mounting orientation of each spray assembly 202 on the side wall 108, the rotation about axis "x" can be clockwise or counterclockwise. As the union shaft 242, the rotating distribution block 256 and the rotary cage 204 rotate, the fixed distribution block 254 is held stationary by the adjustment screw 272 and its connection to the fixed connection member 208. Drive assembly 206 can be directly connected to the rotary cage 204, for example, a motor shaft directly connected to the rotary cage 204 to drive the rotation of the various components. Alternatively, the drive assembly 206 can include a gear assembly to drive the rotation at a desired revolutions per minute (rpm). In yet another embodiment, drive assembly 206 can include a belt or chain drive assembly to impart rotation to multiple spray assemblies 202 at the same time.

Figure 8:
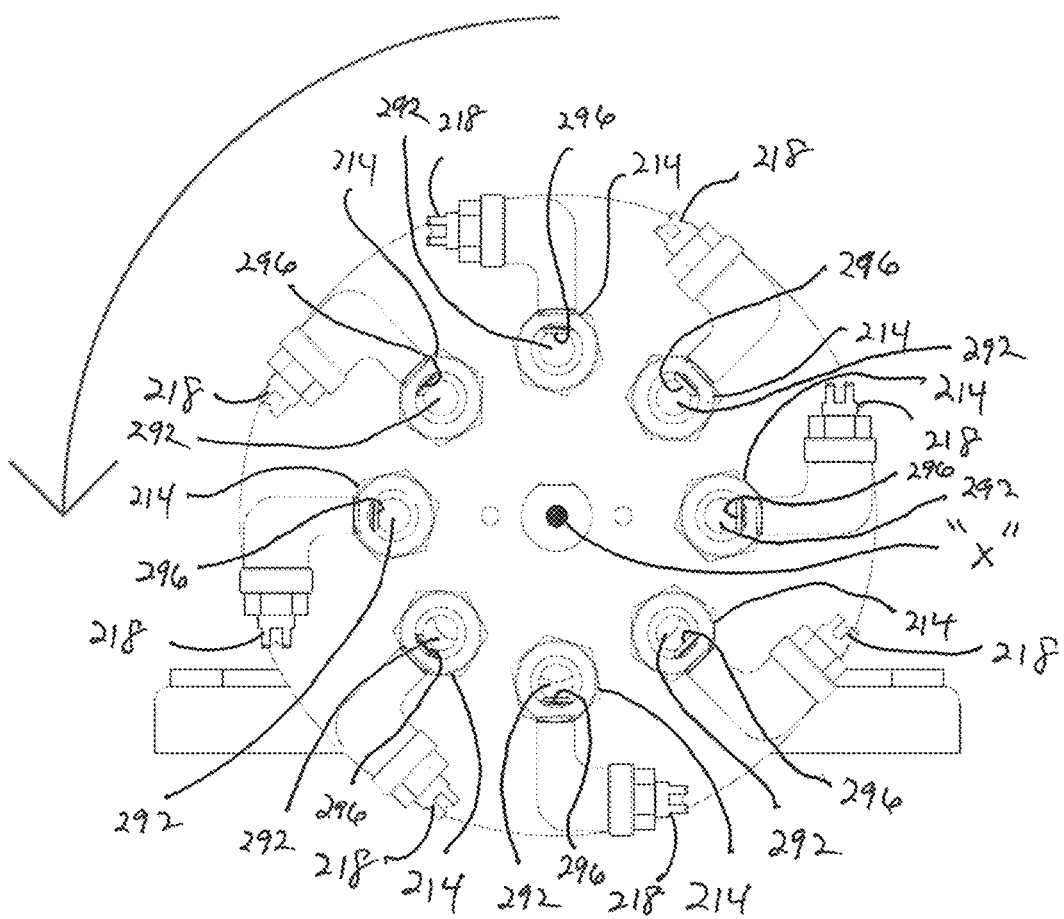
FIG. 8 is a section view of a rotary cage according to an embodiment of the present invention.

In operation, a user actuates either locally, via a switch or button, or remotely, via a control system, the drive assembly 206. Rotational energy from the drive assembly 206 is imparted to the rotary cage 204 such that the rotary cage 204, the rotating distribution block 256 and the union shaft 242 are caused to rotate about axis "x" as shown in FIG. 8. Next a pressurized fluid, i.e., a gas and/or liquid fluid is supplied to the fixed fluid inlet 232. The pressurized fluid flows through the connection flow channel 234 and out the fixed fluid outlet 234. From the fixed fluid outlet 234, the pressurized fluid enters the rotary union 209 through the fixed union fluid inlet 242, whereby the pressurized fluid is directed into the now rotating shaft flow channel 246 of the union shaft 242. The pressurized fluid exits the rotating union fluid outlet 248 and enters the valve inlet 252, whereby it is directed to the block outlet 262. As the rotation face 280 of the rotating distribution block 256 rotates relative to the distribution face 266 of the fixed distribution block 254, the individual distribution conduits 284 are sequentially, rotatably introduced to the arcuate aperture 258 along the arcuate length and angular outlet range 266 of the block outlet 262. In this way, the pressurized fluid is only supplied to the individual distribution conduits 284 as they are rotated along the angular outlet range 266 of the arcuate aperture 258. When each distribution conduit 284 is rotatably, fluidly engaged to the arcuate aperture 258, the pressurized fluid flows through the distribution conduit 284, and into the corresponding linear distribution manifold 214 through its manifold inlet 290. The interior manifold flow channel 292 directs the pressurized fluid to the each manifold aperture 296 whereby the pressurized fluid is subsequently dispensed from and sprayed out of the individual spray nozzles 218. The pressurized fluid is sprayed from the spray nozzles 218 for the entire time that their associated distribution conduit 284 is fluidly engaged with the arcuate aperture 258.

Figure 9:
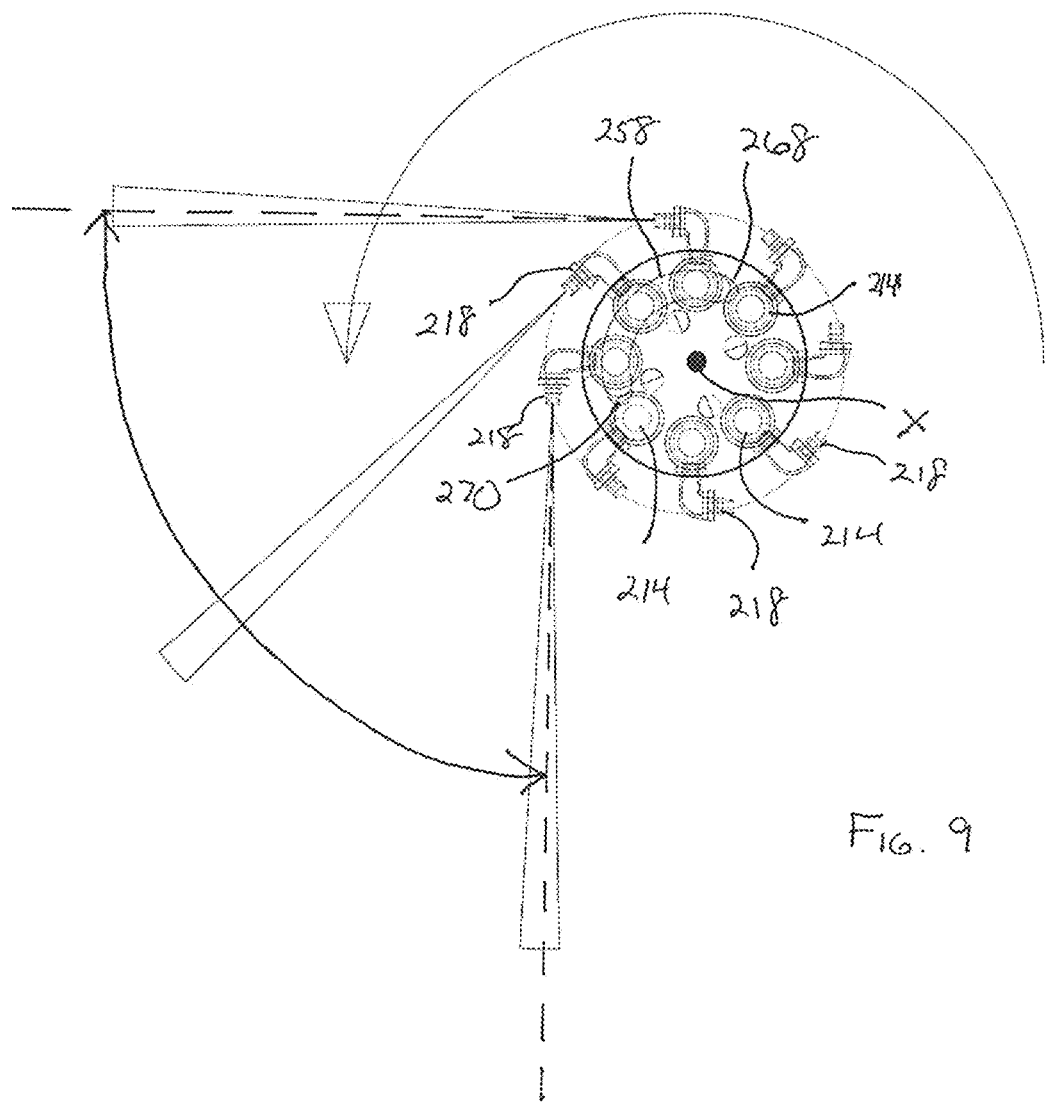
FIG. 9 is a section view of the rotary spray assembly illustrating a spray dispensing pattern according to an embodiment of the present invention.
Figure 10:
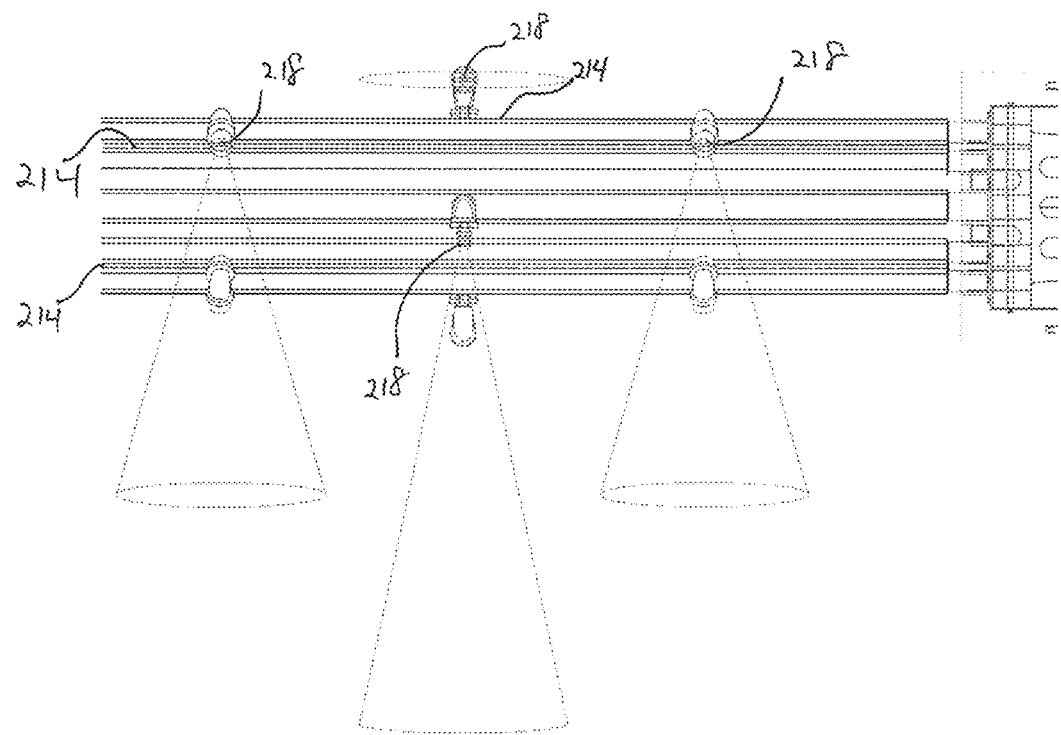
FIG. 10 is a side view of the rotary spray assembly illustrating the spray dispensing pattern of FIG. 9.

Dependent upon the angular outlet range 266 and the number of linear distribution manifolds 214 that comprise the rotary cage 204, one or more of the distribution conduits 284 can be fluidly engaged with the arcuate aperture 258 at any time such the pressurized fluid can be simultaneously sprayed from one or more of the linear distribution manifolds 284 at any one time. For example, arcuate aperture 258 with the angular outlet range 266 of approximately 90 degrees as shown in FIGS. 9 and 10, can simultaneously supply water to three (3) of the linear distribution manifolds 214, with each linear distribution manifold 214 having its own spraying orientation as the rotary cage 204 moves around axis "x". Furthermore, it can be seen in FIG. 9 that five (5) of the linear distribution manifolds 214 do not have their associated distribution conduit 284 in fluid communication with the arcuate aperture 258 such there is no supply of pressurized fluid to these five (5) linear distribution manifolds 214. As seen in FIG. 9, the arrangement of the arcuate aperture 258 provides a spray profile that is approximately horizontal when distribution conduit 284 fluidly engages the arcuate aperture 258 at the first end 268 and approximately vertical when distribution conduit 284 reaches the second end 270. As such, the spray action is always moving along a downward trajectory to wash any contaminants or particulates on the carcasses 104 to a floor of the cabinet/tunnel 102.

The processing liquid or gas can comprise a chemical intervention solution that provides the appropriate application for the material being processed. In the situation of a food product, the processing liquid can comprise a chemical intervention solution chosen from chlorine, bromine, cetylpyridinium chloride (CPC), an organic acid, a peroxycarboxylic acid, trisodium phospate, acidified sodium chlorite, and chlorine dioxide.

In some preferred embodiments, the processing liquid comprises at least one peroxycarboxylic acid having 2-18 carbon atoms. In some aspects, the peroxycarboxylic acid solution is chosen from peroxyformic acid, peroxypropionic acid, peroxyacetic acid, peroxybutanoic acid, peroxypentanoic acid, peroxyhexanoic acid, peroxyheptanoic acid, peroxyoctanoic acid, peroxynonanoic acid, peroxydecanoic acid, peroxyundecanoic acid, peroxydodecanoic acid, peroxylactic acid, peroxymaleic acid, peroxyascorbic acid, peroxyhydroxyacetic acid, peroxyoxalic acid, peroxymalonic acid, peroxysuccinic acid, peroxyglutaric acid, peroxyadipic acid, peroxypimelic acid, peroxysubric acid, peroxycitric acid and mixtures thereof. Preferably, the intervention solution comprises an equilibrium peroxyacetic acid or a pH modified peroxyacetic acid.

In some aspects, the equilibrium peroxyacetic acid preferably has a pH above about 3.0 and below about 7.0, in some aspects about 3.5 to about 5.5, and in some other aspects about 3.5 to about 5.0, although subranges within these ranges is contemplated.

In some aspects, the pH modified peroxycarboxylic acid preferably has a pH above about 7.0 and below about 10.0, in certain aspects a pH range of about 7.0 to about 9.5, and in some other aspects a pH range of about 7.5 to about 9.0, although subranges within these ranges is contemplated. The pH modified peroxycarboxylic acid can be prepared by combining a peroxycarboxylic acid solution, such as a peroxyacetic acid solution, with one or more buffering agents chosen from sodium hydroxide, potassium hydroxide, the sodium salt of carbonic acid, the potassium salt of carbonic acid, phosphoric acid, silicic acid or mixtures thereof, in a quantity that is necessary to bring the solution to said pH range One of ordinary skill in the art will appreciate that other alkalizing chemistries approved for direct food contact may also be used, whether alone or in combination with any of the foregoing buffering agents. The quantity of the buffering agent in a buffered peroxycarboxylic acid solution will generally be in the range of about 0.01% to about 10% by volume of the total solution, but other volumes of the buffering agent may be utilized depending upon various parameters, such as local water condition, including pH, hardness and conductivity.

Simulations

Figure 11:
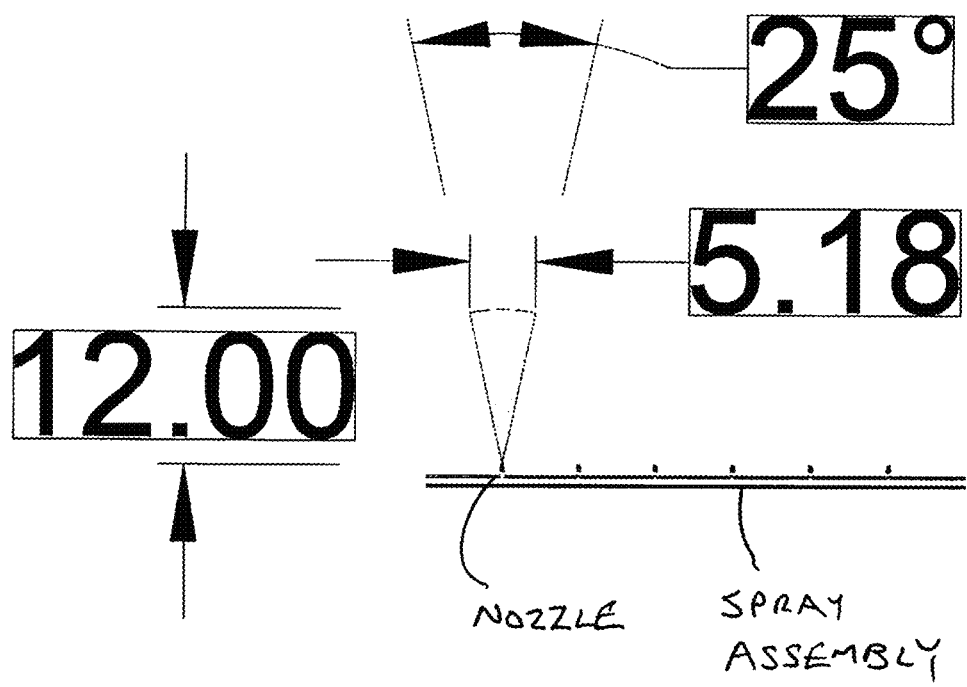
FIG. 11 is a side view illustrating a spray profile for spray nozzles utilized in Simulations 1 and 2.

In order to demonstrate the improved performance of the rotating spray assemblies 202 as compared to the conventional oscillating spray assemblies 110, two simulations were conducted to compare fluid usage and cleaning efficiency between the different spray assembly designs. In preparing the simulations, various assumptions were made including using the same individual spray nozzles within each of the different spray assemblies. Each spray nozzle was simulated to dispense one (1) gpm of fluid at forty (40) psig. The spray pattern for each spray nozzle is as illustrated within FIG. 11 and had a twenty five (25°) spray angle with impact force assumed to be negligible at a distance of twelve (12) inches from a nozzle outlet. The overhead conveyor speed was assumed to be twenty six (26) feet/minute and animal carcasses were assumed to be hung at a distance of forty eight (48) inches apart.

Simulation 1: Prior Art Oscillating Spray Bar Assembly

Figure 12:
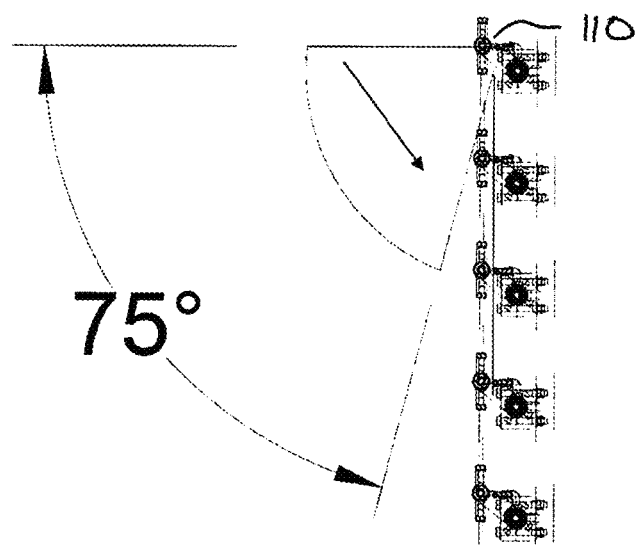
FIG. 12 is an end view of an oscillating spray assembly as utilized in Simulation 1 illustrating a spray profile of the oscillating spray assembly.

With respect to the first simulation involving the oscillating spray assemblies 110, the oscillation pattern for each oscillating spray assembly 110 modeled in the simulation is shown in FIG. 12. Each oscillating spray bar 110 completes oscillation through a seventy five (75°) vertical arc in one (1) second (a half second down stroke, a half second up stroke) with fluid being dispensed only on the down stroke. A representative illustration of the simulation for the oscillating spray assembly 110 is shown in FIG. 13. As illustrated, Simulation 1 requires a footprint of just over one hundred twenty five (125) inches.

Figure 14:
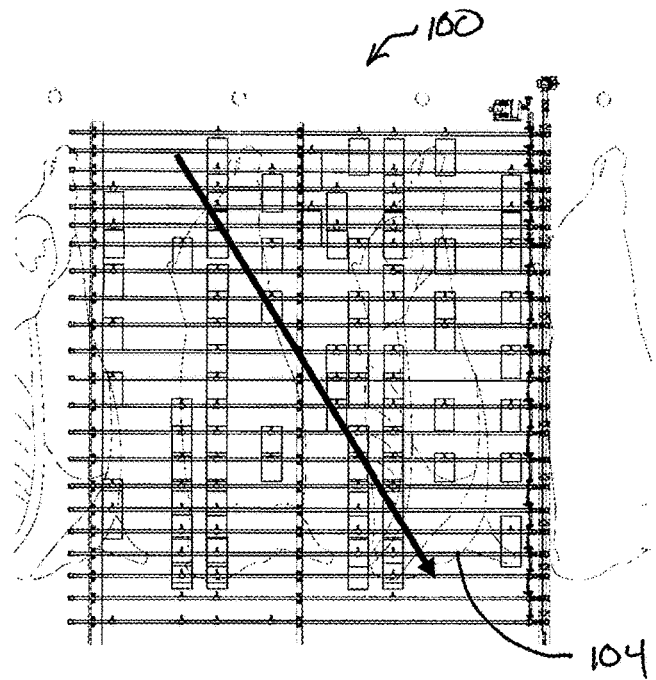
FIG. 14 is a side view of the oscillating spray system as utilized in Simulation 1 illustrating downward impingement of spray on items being sprayed.

Simulation 1 consisted of a spray system utilizing twenty-two (22) oscillating spray assemblies 110 with a combined total of two hundred twenty (220) nozzles. Each nozzle had an "on time" (during the down stroke only) of fifty (50)%. Thus, the oscillating spray assemblies 110 of Simulation 1 had an anticipated fluid use rate of 110 gpm. As can be seen in FIG. 14, the oscillating spray assemblies 110 of Simulation 1 have a spray direction that impinges upon the carcasses to direct debris from the top to the bottom of the carcass and ultimately, to the floor and drain of the cabinet/tunnel. As seen in FIGS. 15, 16, 17 and 18, the oscillating spray assemblies 110 as used in Simulation 1 ultimately lead to different areas of the carcass being sprayed for varying amounts of times (four (4) seconds of intermittent spray versus five (5) seconds of intermittent spray).

Simulation 2: Rotating Spray Assembly

Figure 19:
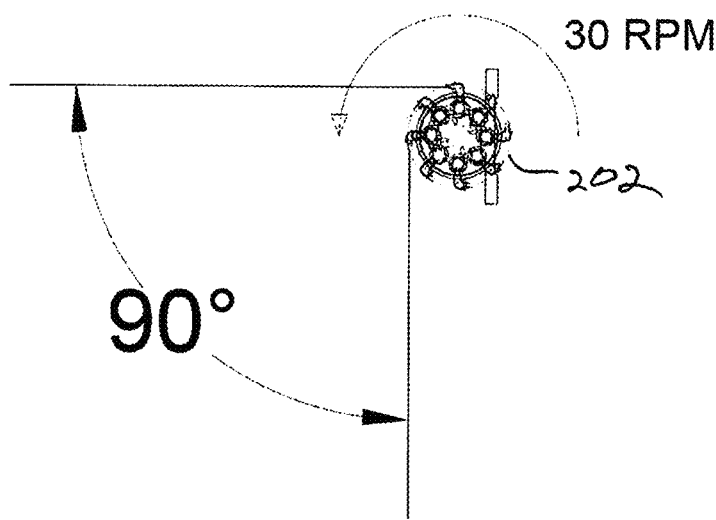
FIG. 19 is an end view of a rotating spray assembly as utilized in Simulation 2 illustrating a spray profile of the rotating spray assembly according to an embodiment of the present invention.

With respect to the second simulation involving the rotating spray assemblies 202, the rotation pattern for each rotating spray assembly 202 is shown in FIG. 19. Each rotating spray bar is rotated at a continuous rate of thirty (30) rpm, with each rotating spray assembly 202 spraying fluid over a range of ninety (90)° (¼ of the rotation). A representative illustration of the simulation for the rotating spray assembly 202 is shown in FIG. 20. As illustrated, Simulation 2 requires a footprint of approximately sixty (60) inches.

Figure 21:
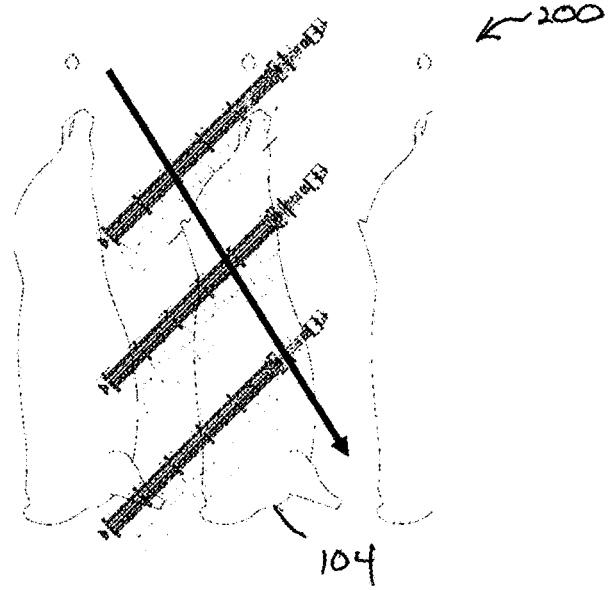
FIG. 21 is a side view of the rotating spray system as utilized in Simulation 2 illustrating downward impingement of spray on items being sprayed according to an embodiment of the present invention.
Figure 15:
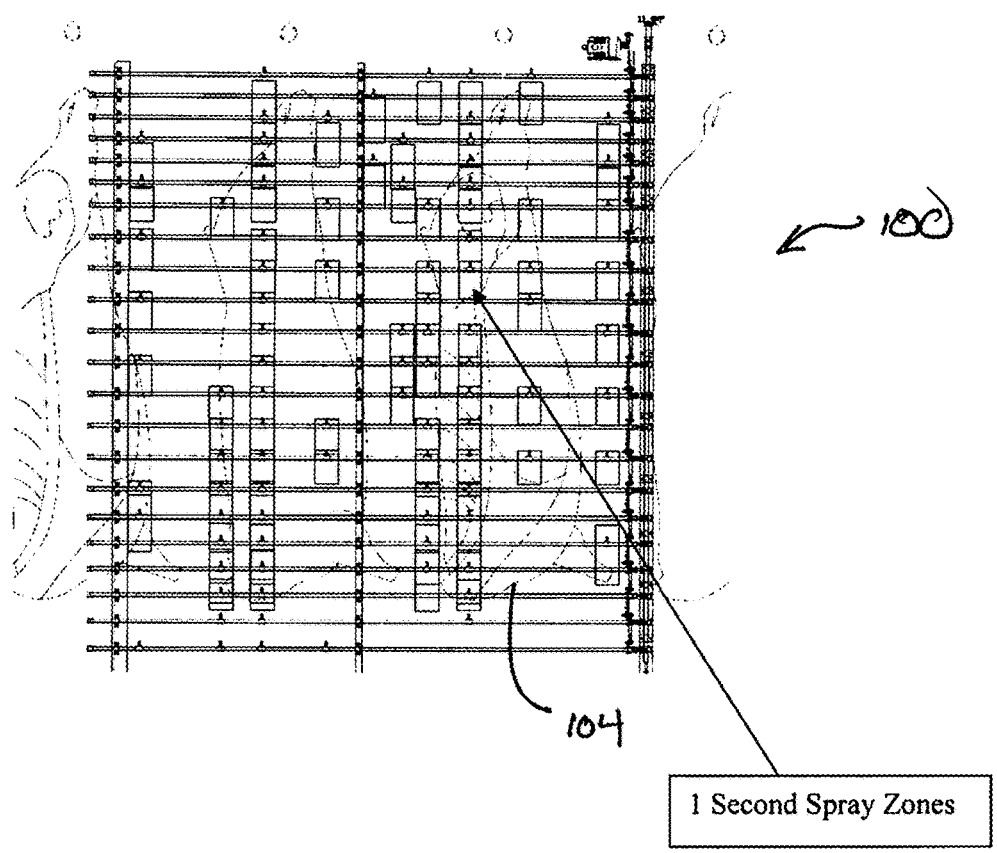
FIG. 15 is a side view of the oscillating spray system as utilized in Simulation 1 illustrating 1 second spray zones on items being sprayed.
Figure 16:
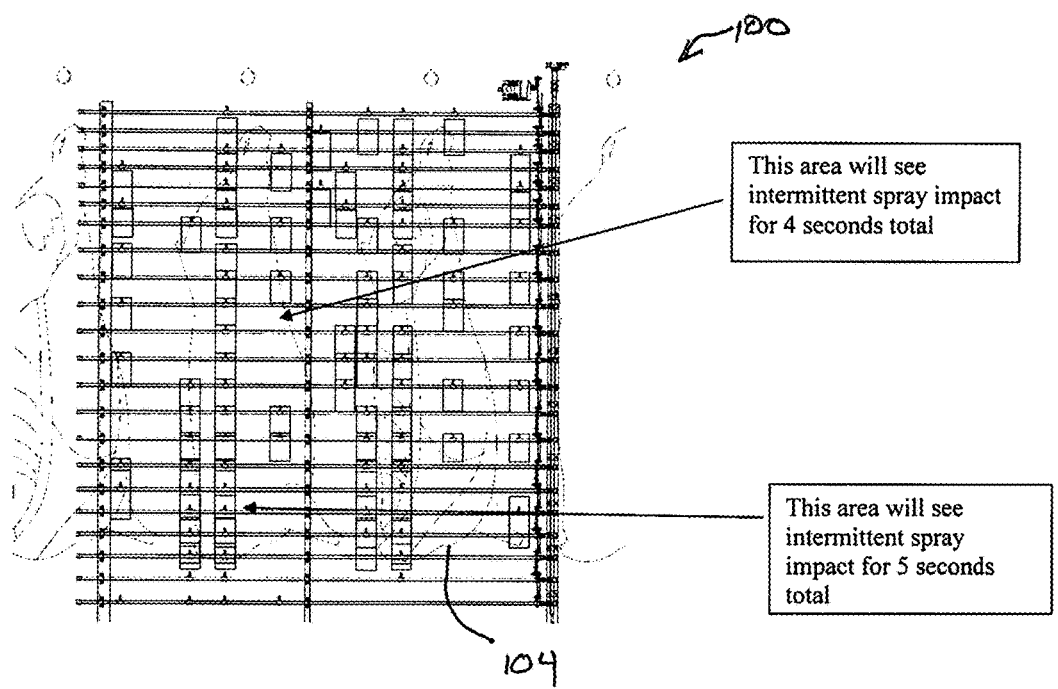
FIG. 16 is a side view of the oscillating spray system as utilized in Simulation 1 illustrating intermittent spray impact on items being sprayed.
Figure 17:
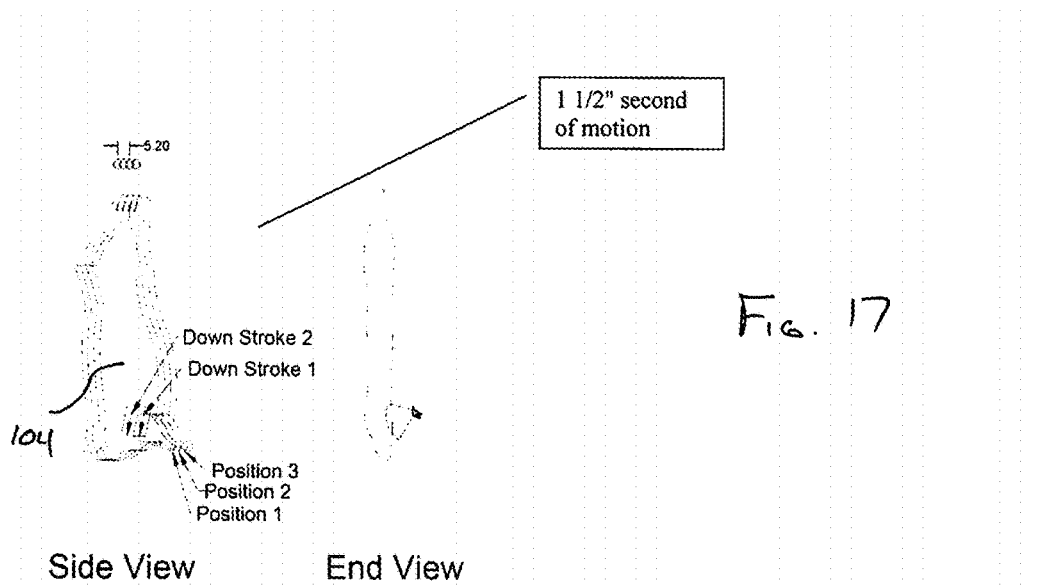
FIG. 17 is a representation of spray impact on items being sprayed during a period of 1.5 seconds with the oscillating spray system as utilized in Simulation 1.
Figure 18:
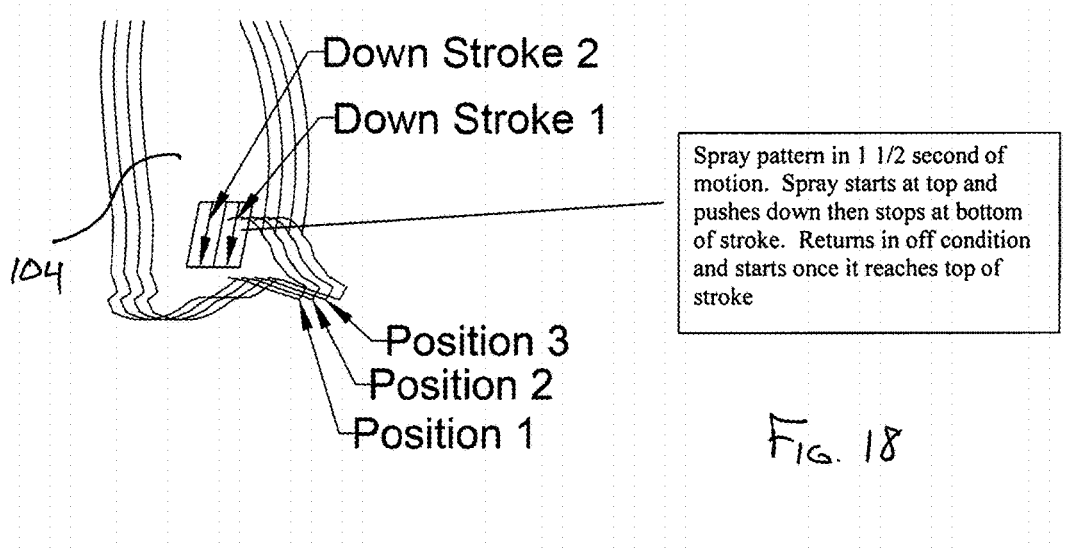
FIG. 18 is an enlarged, detailed view of a portion of FIG. 17.
Figure 23:
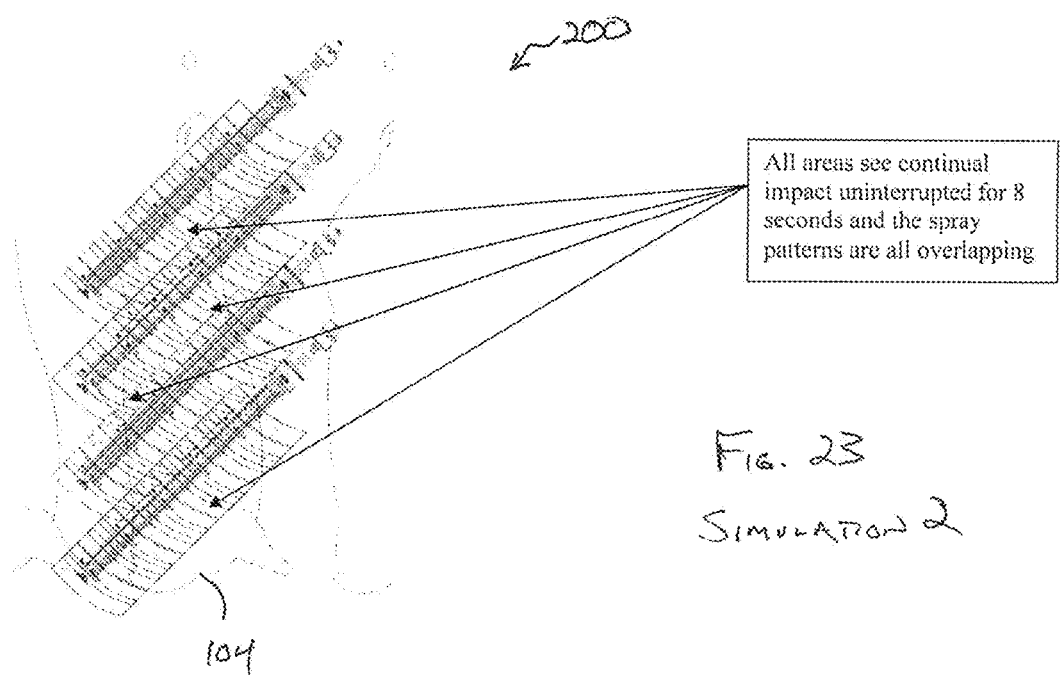
FIG. 23 is a side view of the rotating spray system as utilized in Simulation 2 illustrating continual spray impact on items being sprayed according to an embodiment of the present invention.

Simulation 2 consisted of a spray system utilizing four rotating spray assemblies 202 with a combined total of three hundred twenty (320) nozzles. The arcuate aperture 258 of each rotating spray assembly 202 was arranged to provide each nozzle with an "on time" (spray during ninety (90°) of rotation) of twenty five (25)%. Thus, the rotating spray assemblies 202 of Simulation 2 had an anticipated fluid use rate of eighty (80) gpm. As can be seen in FIG. 21, the rotating spray assemblies 202 of Simulation 2 also have a spray direction that impinges upon the carcasses to direct debris from the top to the bottom of the carcass and ultimately, to the floor and drain of the cabinet/tunnel. As seen in FIGS. 22 and 23, the rotating spray assemblies 202 as used in Simulation 2 ultimately leads to each area of the carcass experiencing, continual, uninterrupted and overlapping spray impact for a period of eight (8) seconds.

A comparison of the simulations demonstrates that the rotating spray assemblies 202 use less fluid and a smaller footprint while providing superior spray performance than is experienced with the oscillating spray assemblies 110. Specifically, the total anticipated water flow rate for Simulation 1 is one hundred ten (110) gpm, while that of Simulation 2 is eighty (80) gpm, which results in about thirty (30)% less gas or liquid being used. Also, Simulation 2 results in continual impact spraying for about eight (8) seconds with an overlapping spray pattern, while Simulation 1 results in intermittent spray during the "down stroke" having a total spray impact between about four (4) and about five (5) seconds, resulting in an improvement to expected spray impact of sixty (60) to one hundred (100)%. Thus, Simulation 2 has a continual, uninterrupted surface impact that continually pushes the stream in a downward direction on the material being impacted by the spray and having the highest total surface spray impact dwell time. Further, compared to Simulation 1, Simulation 2 is able to utilize less than half the length of the cabinet that is required for Simulation 1, resulting in a more efficient use of space.

Although specific examples have been illustrated and described herein, it will be appreciated by those of ordinary skill in the art that any arrangement calculated to achieve the same purpose could be substituted for the specific examples shown. This application is intended to cover adaptations or variations of the present subject matter. Therefore, it is intended that the present invention be defined by the attached claims and their legal equivalents.

The invention claimed is:

1. A spray system, comprising:
   at least one spray bar assembly, said spray bar assembly comprising:
   a rotary cage including a plurality of linear distribution manifolds, each linear distribution manifold including a manifold inlet and a manifold flow channel, wherein a plurality of manifold apertures are defined along each manifold flow channel and each manifold aperture includes a spray nozzle mounted therein;
   a distribution valve including a fixed distribution block and a rotary distribution block, the fixed distribution block including an arcuate aperture and the rotary distribution block including a plurality of distribution conduits, wherein the quantity of distribution conduits is equal to the quantity of linear distribution manifolds and each linear distribution manifold is fluidly coupled to the associated distribution conduit;
   a means for rotating the rotary distribution block relative to the fixed distribution block; and
   a pressurized fluid supply fluidly coupled to the arcuate aperture;
   wherein the rotary distribution block is rotated relative to the fixed distribution block such that individual distribution conduits are sequentially, fluidly engaged with the arcuate aperture such that the pressurized fluid supply is introduced into each linear distribution manifold for dispensing from the associated spray nozzles and that dispensing of the pressurized fluid supply is prevented from each linear distribution manifold when the corresponding distribution conduit is not fluidly engaged with the arcuate aperture.

2. The spray system of claim 1, wherein the arcuate aperture has an angular outlet range of 90 degrees.

3. The spray system of claim 1, wherein at least two of the distribution conduits are simultaneously fluidly engaged to the arcuate aperture as the rotary distribution block rotates relative to the fixed distribution block.

4. The spray system of claim 1, further comprising at least two spray bar assemblies, each spray bar assemblies mounted such that the rotary cages are in parallel relation.

5. The spray system of claim 1, further comprising at least two spray bar assemblies, wherein the arcuate apertures of the at least two spray bar assemblies have differing angular outlet ranges.

6. The spray system of claim 1, wherein the rotary distribution block causes the pressurized fluid supply to be dispensed from the spray nozzles in only a downward trajectory as dictated by the arcuate aperture.

7. The spray system of claim 1, wherein the pressurized fluid comprises at least one peroxycarboxylic acid having between about 2 to 12 carbon atoms.

8. The spray system of claim 1, wherein the rotary distribution block is rotated by the means for rotating at a rate of between about 10 rpm to about 100 rpm.

9. The spray system of claim 1, wherein the means for rotating is selected from the group consisting essentially of: a motor directly coupled to the rotary cage, a belt drive assembly, a chain drive assembly and a gear assembly driven by a motor.

10. A method of spraying items, comprising:
    supplying a pressurized fluid to a distribution valve, said distribution valve including a fixed distribution block and a rotating distribution block, wherein the pressurized fluid is directed into an arcuate aperture on the fixed distribution block;
    rotating the rotating distribution block relative to the fixed distribution block such that a plurality of distribution conduits defined in the rotating distribution block are sequentially introduced to the arcuate aperture;
    directing the pressurized fluid through each distribution conduit when each distribution conduit is fluidly engaged with the arcuate aperture, each distribution conduit being fluidly coupled to a linear distribution manifold, wherein the linear distribution manifold defines a rotary cage that rotates in conjunction with the rotating distribution block; and
    spraying the pressurized fluid from a plurality of spray nozzles on each linear distribution manifold when the corresponding distribution conduit is fluidly engaged with the arcuate aperture.

11. The method of claim 10, wherein the step of spraying further comprises:
    spraying the pressurized fluid in only a downward trajectory.

12. The method of claim 10, further comprising:
    providing the pressurized fluid, wherein the pressurized fluid comprises at least one peroxycarboxylic acid having between about 2 to 12 carbon atoms.

13. The method of claim 10, further comprising:
    conveying a suspended carcass past the rotary cage.

14. The method of claim 10, further comprising:
    rotating the rotation distribution block at a rate of between about 10 rpm to about 100 rpm.

15. A spray bar assembly, comprising:
    a rotary cage including a plurality of linear distribution manifolds, each linear distribution manifold including a manifold flow channel, wherein each manifold flow channel includes a plurality of spray nozzles fluidly coupled thereto; and
    a distribution valve including a fixed distribution block and a rotary distribution block, the fixed distribution block including an arcuate aperture and the rotary distribution block including a plurality of distribution conduits, wherein the quantity of distribution conduits is equal to the quantity of linear distribution manifolds and each linear distribution manifold is fluidly coupled to the associated distribution conduit, such that rotation of the rotary distribution block relative to the fixed distribution block sequentially, fluidly engages each distribution conduit to the arcuate aperture.

16. The spray bar assembly of claim 15, wherein the arcuate aperture has an angular outlet range of about 90 degrees.

17. The spray bar assembly of claim 16, wherein the angular outlet range is selected such that the arcuate aperture is simultaneously, fluid engaged to two or more distribution conduits.

* * * * *